(12) United States Patent
Kuroda

(10) Patent No.: US 10,753,304 B2
(45) Date of Patent: Aug. 25, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Ryusuke Kuroda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/508,408

(22) Filed: Jul. 11, 2019

(65) Prior Publication Data
US 2020/0049095 A1    Feb. 13, 2020

(30) Foreign Application Priority Data

Aug. 7, 2018    (JP) .................................. 2018-148050

(51) Int. Cl.
| | |
|---|---|
| F02D 41/30 | (2006.01) |
| F01M 13/02 | (2006.01) |
| F02D 35/00 | (2006.01) |
| F02D 41/00 | (2006.01) |
| B60K 6/44 | (2007.10) |

(52) U.S. Cl.
CPC ....... F02D 41/3005 (2013.01); F01M 13/023 (2013.01); F02D 35/0092 (2013.01); F02D 41/0007 (2013.01); *B60K 6/44* (2013.01); *B60Y 2200/92* (2013.01)

(58) Field of Classification Search
CPC ........... G02D 41/0007; G02D 41/3005; G02D 41/0087; G02D 41/0005; G02D 41/029; G02D 41/025; G02D 41/12; F02D 35/0098; F02D 37/02; F02D 2041/0022; F01M 13/023; F02P 5/1512; F02N 3/035; F01N 3/101

See application file for complete search history.

(56) References Cited

U.S. PATENT DOCUMENTS

| | | | |
|---|---|---|---|
| 2009/0133387 A1* | 5/2009 | Nishizawa | ............ F02D 41/029 60/286 |
| 2011/0126520 A1* | 6/2011 | Kim | .................... F02D 41/0055 60/278 |
| 2014/0041362 A1* | 2/2014 | Ulrey | .................. F02D 41/0087 60/274 |
| 2016/0251988 A1* | 9/2016 | Nakajima | ............. F01N 3/2006 60/274 |
| 2019/0256100 A1* | 8/2019 | Okishima | ............... F02D 17/02 |

* cited by examiner

*Primary Examiner* — George C Jin
(74) *Attorney, Agent, or Firm* — Oliff PLC

(57) ABSTRACT

A blow-by gas treating device discharges blow-by gas into intake air. A controller selects and executes one of a fuel cutoff process and a fuel introduction process when stopping combustion in a cylinder under a situation in which a crankshaft of the internal combustion engine is rotating. An injection valve controlling section controls a fuel injection valve to regulate a fuel injection amount in a period in which the combustion in the cylinder is stopped under the situation in which the crankshaft is rotating. The injection valve controlling section decreases the fuel injection amount from the fuel injection valve as an oil temperature that is the temperature of engine oil increases.

8 Claims, 4 Drawing Sheets

CONTROLLER AND CONTROL METHOD FOR INTERNAL COMBUSTION ENGINE

BACKGROUND

1. Field

The present disclosure relates to a controller and a control method for an internal combustion engine. The controller and the control method are employed for a spark-ignition internal combustion engine.

2. Description of Related Art

US Patent Application Publication No. 2014/0041362 discloses an example of an internal combustion engine fueled by gasoline. The exhaust purification system of the internal combustion engine includes a three-way catalyst provided in the exhaust passage and a particulate filter arranged at the downstream side of the three-way catalyst in the exhaust passage.

In some cases, the internal combustion engine disclosed in the document stops combustion in the cylinder when the load on the internal combustion engine is low in a case in which the required torque of the internal combustion engine is reduced, for example, due to cancellation of the accelerator operation. In such a combustion stop period, one of a fuel cutoff process of stopping the fuel injection of the fuel injection valve and a fuel introduction process is selected. The fuel introduction process causes the fuel injection valve to inject fuel and causes the fuel to flow out unburned from inside the cylinder to the exhaust passage. According to the document, the fuel introduction process is executed when the particulate filter is regenerated. In contrast, the fuel cutoff process is executed when the regeneration is not performed.

In the fuel introduction process, the fuel injected from the fuel injection valve flows through the exhaust passage together with air. When the fuel is introduced into the three-way catalyst, combustion of the fuel increases the temperature of the three-way catalyst. Then, high temperature gas flows into the particulate filter, increasing the temperature of the particulate filter. This burns particulate matter (PM) trapped by the particulate filter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A controller for an internal combustion engine is provided. The internal combustion engine includes a blow-by gas treating device that discharges blow-by gas into intake air and being configured to burn, in a cylinder, air-fuel mixture containing fuel injected from a fuel injection valve by spark discharge of an ignition device. The controller is configured to select and execute one of a fuel cutoff process and a fuel introduction process when stopping combustion in the cylinder under a situation in which a crankshaft of the internal combustion engine is rotating. The fuel cutoff process stops fuel injection of the fuel injection valve. The fuel introduction process causes the fuel injection valve to inject fuel, thereby allowing the fuel to flow out unburned from the cylinder to an exhaust passage. The controller further comprises an injection valve controlling section. The injection valve controlling section is configured to control the fuel injection valve to regulate a fuel injection amount in a period in which the combustion in the cylinder is stopped under the situation in which the crankshaft is rotating. The injection valve controlling section is further configured to decrease the fuel injection amount from the fuel injection valve as an oil temperature that is the temperature of engine oil increases.

The fuel becomes more likely to volatilize from the engine oil as the oil temperature increases. That is, the fuel concentration of the blow-by gas becomes more likely to increase as the oil temperature increases. Therefore, the above-described configuration reduces the amount of fuel injected from the fuel injection valve in the combustion stop period as the oil temperature increases. This prevents the fuel that reaches the three-way catalyst from being excessive, thereby preventing the three-way catalyst from being excessively heated.

In the fuel introduction process, fuel passes unburned through the cylinder, so that the amount of fuel mixed into the engine oil of the internal combustion engine is likely to increase. The fuel mixed in the engine oil will hereafter be referred to as diluting fuel in some cases. When the diluting fuel increases, the fuel concentration of the blow-by gas tends to be high due to the fuel volatilizing from the engine oil.

In an internal combustion engine equipped with a blow-by gas treating device that discharges blow-by gas into intake air, when the fuel introduction process is executed, the blow-by gas flows through the exhaust passage, so that the blow-by gas, which contains the fuel volatilizing from the engine oil, reaches the three-way catalyst.

That is, in the fuel introduction process, the fuel contained in the blow-by gas is delivered to the three-way catalyst in addition to the fuel injected from the fuel injection valve. Therefore, if the fuel concentration of the blow-by gas is high due to increase in diluting fuel, the amount of fuel reaching the three-way catalyst may be excessive during the execution of the fuel introduction process. When excessive fuel is introduced into the three-way catalyst, the three-way catalyst may be excessively heated. The above-described configuration prevents such excessive heating of the three-way catalyst.

Example 2

In the controller of Example 1, the injection valve controlling section is configured to decrease the fuel injection amount from the fuel injection valve as the oil temperature increases when the oil temperature is higher than or equal to a temperature determination value.

When the oil temperature is low, fuel is unlikely to volatilize from the engine oil, so that the concentration of fuel in the blow-by gas does not increase easily. Thus, the fuel reaching the three-way catalyst is unlikely to be excessive. That is, when the oil temperature is higher than or equal to the temperature determination value as in the above-described configuration, the amount of fuel injected from the fuel injection valve may be reduced in the combustion stop period as the oil temperature increases.

Example 3

The controller of Example 1 or 2 further includes a dilution learning section that is configured to learn a concentration of fuel contained in the blow-by gas as a dilution learned value. The injection valve controlling section is configured to calculate a required injection amount as a target value of the fuel injection amount from the fuel injection valve and control the fuel injection valve based on the required injection amount. The injection valve controlling section is further configured to decrease the required injection amount as the dilution learned value increases.

In the above-described configuration, the required injection amount is corrected by reflecting the dilution learned value. Therefore, it is possible to introduce a great amount of fuel into the three-way catalyst within the range in which excessive heating of the three-way catalyst can be prevented, while preventing excessive heating of the three-way catalyst.

Example 4

The controller of Example 1 or 2 is further configured to set, when the combustion in the cylinder is performed, the fuel injection amount from the fuel injection valve by using an air-fuel ratio correction value for reducing a deviation between an exhaust air-fuel ratio and a target exhaust air-fuel ratio. The injection valve controlling section is configured to calculate a required injection amount as a target value of the fuel injection amount from the fuel injection valve and control the fuel injection valve based on the required injection amount. The injection valve controlling section is further configured to decrease the required injection amount as the air-fuel ratio correction value before execution of the fuel introduction process increases.

In a configuration that uses exhaust air-fuel ratio feedback (hereinafter referred to as exhaust air-fuel ratio F/B) to calculate the required injection amount, a great value of the air-fuel ratio correction value for reducing the deviation allows for inference that the fuel concentration of the blow-by gas is high. Accordingly, the above-described configuration reduces the required injection amount as the air-fuel ratio correction value increases. This prevents excessive fuel from being introduced into the three-way catalyst, thereby preventing the three-way catalyst from being excessively heated.

Example 5

The controller of any one of Examples 1 to 4 is further configured to set, when the combustion in the cylinder is performed, the fuel injection amount from the fuel injection valve by using an air-fuel ratio correction value for reducing a deviation between an exhaust air-fuel ratio and a target exhaust air-fuel ratio. The injection valve controlling section is configured not to execute the fuel introduction process when the air-fuel ratio correction value before execution of the fuel introduction process is greater than or equal to an allowable value.

The fuel introduced into the three-way catalyst becomes more likely to be excessive as the fuel concentration of the blow-by gas increases. Accordingly, the three-way catalyst is likely to be excessively heated. Thus, the above-described configuration does not execute the fuel introduction process when the air-fuel ratio correction value is greater than or equal to the allowable value. This prevents the three-way catalyst from being excessively heated.

Example 6

The controller of any one of Examples 1 to 5 further includes a dilution learning section that calculates an amount of fuel contained in the engine oil as an estimated dilution value. The injection valve controlling section is configured not to execute the fuel introduction process when the estimated dilution value is greater than or equal to a threshold.

When the amount of diluting fuel, which is the fuel contained in the engine oil, is great, the amount of fuel volatilizing from the engine oil increases, and the concentration of fuel in the blow-by gas tends to be high. If the fuel introduction process is executed at this time, excessive fuel is introduced into the three-way catalyst, which may excessively heat the three-way catalyst. Therefore, it is better not to execute the fuel introduction process when the estimated dilution value is greater than or equal to the threshold.

Example 7

A control method for an internal combustion engine is provided that performs the various processes described in Examples 1 to 6.

Example 8

A non-transitory computer readable memory medium is provided that stores a program that causes a processing device to perform the various processes described in Examples 1 to 6.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 100 for an internal combustion engine 10 according to an embodiment of the present disclosure will be described with reference to FIGS. 1 to 6.

Figure 1:
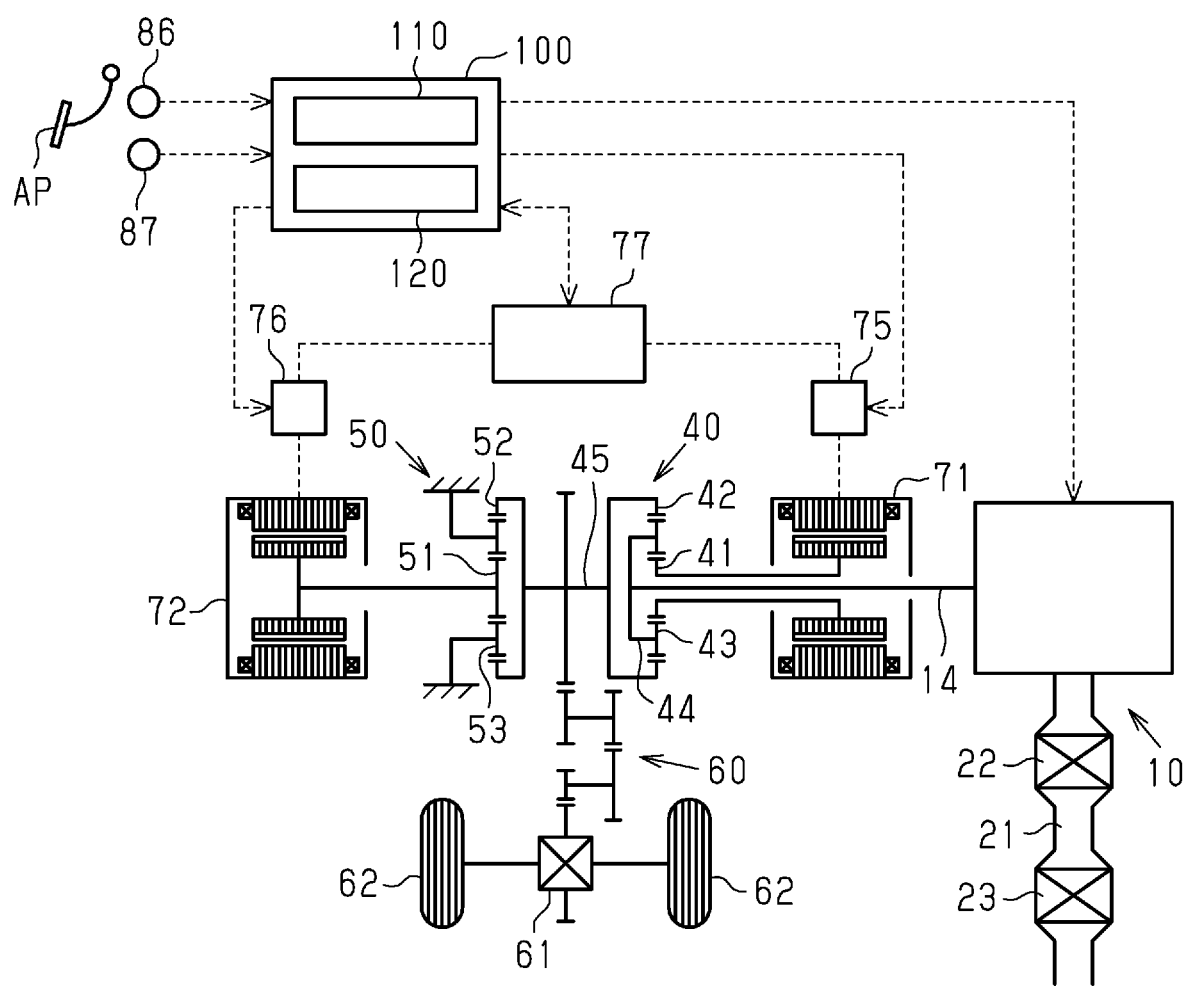
FIG. 1 is a diagram schematically showing a controller for an internal combustion engine according to an embodiment of the present disclosure, the controller being implemented as an internal combustion engine controlling unit (engine controlling unit) mounted on a hybrid vehicle.

FIG. 1 schematically illustrates the structure of a hybrid vehicle. As shown in FIG. 1, the hybrid vehicle includes the internal combustion engine 10, a driving force distribution-integration mechanism 40 connected to a crankshaft 14 of the internal combustion engine 10, and a first motor generator 71 connected to the driving force distribution-integration mechanism 40. The driving force distribution-integration mechanism 40 is coupled to a second motor generator 72 via a reduction gear 50 and to driven wheels 62 via a speed reduction mechanism 60 and a differential 61.

The driving force distribution-integration mechanism 40 is a planetary gear mechanism and includes a sun gear 41, which is an external gear, and a ring gear 42, which is an internal gear coaxially arranged with the sun gear 41. Pinion gears 43 meshing with the sun gear 41 and the ring gear 42 are provided between the sun gear 41 and the ring gear 42. The pinion gears 43 are supported by a carrier 44 to be allowed to rotate and orbit. The sun gear 41 is coupled to the first motor generator 71. The carrier 44 is coupled to the crankshaft 14. The ring gear 42 is connected to a ring gear shaft 45. The ring gear shaft 45 is coupled to both of the reduction gear 50 and the speed reduction mechanism 60.

When the output torque of the internal combustion engine 10 is input to the carrier 44, the output torque is distributed to the sun gear 41 and the ring gear 42. That is, the output torque of the internal combustion engine 10 is input to the first motor generator 71 to cause the first motor generator to generate power.

In contrast, when the first motor generator 71 is caused to perform as an electric motor, the output torque of the first motor generator 71 is input to the sun gear 41. The output torque of the first motor generator 71 input to the sun gear 41 is distributed to the carrier 44 and the ring gear 42. Also, the output torque of the first motor generator 71 is input to the crankshaft 14 via the carrier 44 to rotate the crankshaft 14. This process, in which the crankshaft 14 is rotated by operation of the first motor generator 71, is referred to as "motoring" in the present embodiment.

The reduction gear 50 is a planetary gear mechanism and includes a sun gear 51 and a ring gear 52. The sun gear 51 is an external gear coupled to the second motor generator 72. The ring gear 52 is an internal gear coaxially arranged with the sun gear 51. The ring gear 52 is connected to the ring gear shaft 45. Pinion gears 53 meshing with the sun gear 51 and the ring gear 52 are provided between the sun gear 51 and the ring gear 52. Each pinion gear 53 is rotational but is not allowed to orbit.

By causing the second motor generator 72 to perform as a generator when decelerating the vehicle, regenerative braking force is generated in the vehicle in accordance with the amount of power generated by the second motor generator 72. Also, when the second motor generator 72 is caused to perform as an electric motor, the output torque of the second motor generator 72 is input to the driven wheels 62 via the reduction gear 50, the ring gear shaft 45, the speed reduction mechanism 60, and the differential 61. The driven wheels 62 are thus rotated to drive the vehicle.

The first motor generator 71 exchanges electric power with a battery 77 through a first inverter 75. The second motor generator 72 exchanges electric power with the battery 77 through a second inverter 76.

Figure 2:
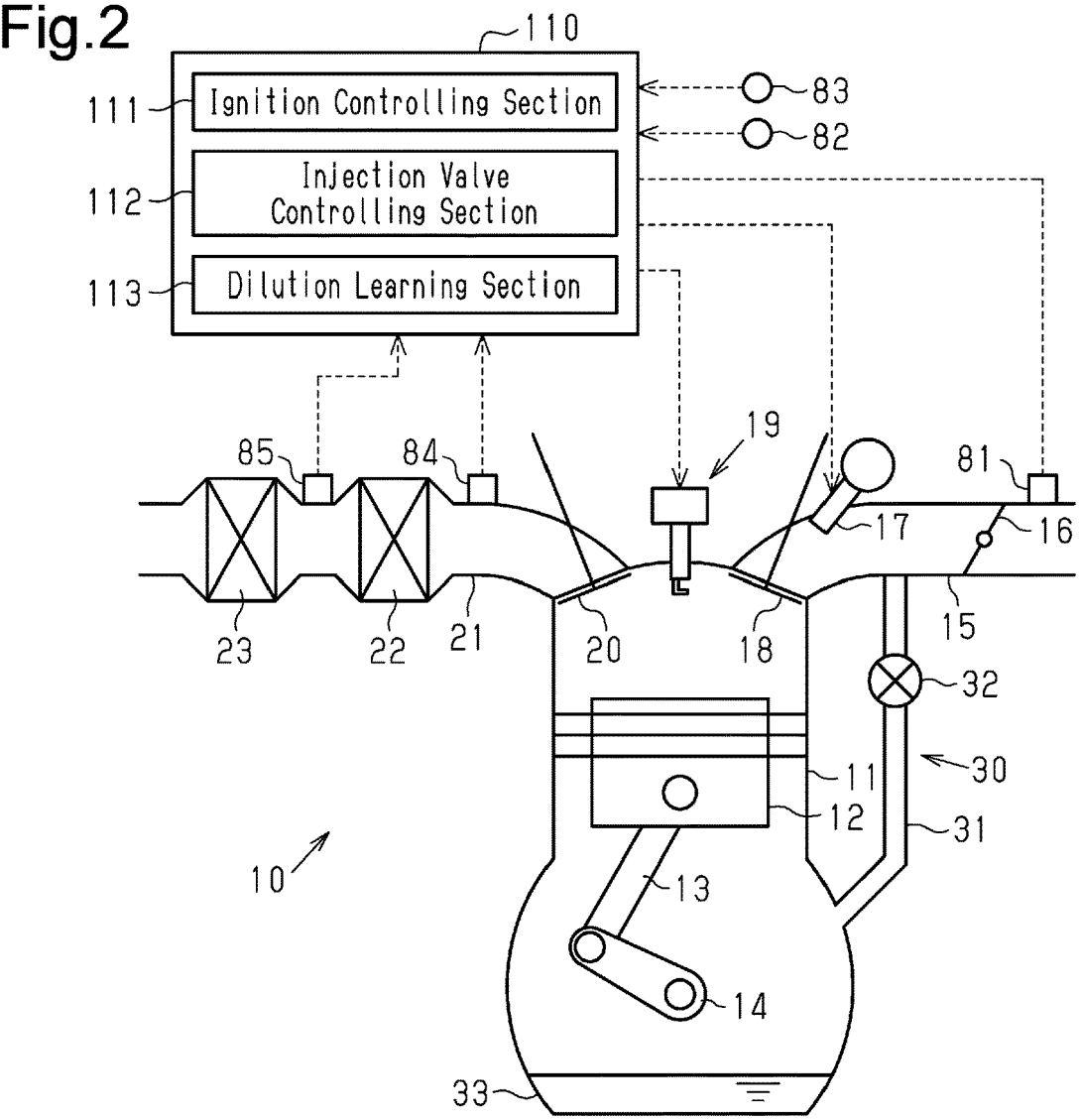
FIG. 2 is a diagram schematically showing the functional configuration of the engine controlling unit of FIG. 1 and an internal combustion engine mounted on the hybrid vehicle.

As shown in FIG. 2, a piston 12 is accommodated and reciprocates in a cylinder 11 of the internal combustion engine 10. The piston 12 is coupled to the crankshaft 14 via a connecting rod 13. The internal combustion engine 10 includes an intake passage 15 and a throttle valve 16 arranged in the intake passage 15. The throttle valve 16 rotates to regulate the amount of intake air into the cylinder 11. An air flowmeter 81 is attached to the intake passage 15 at the upstream side of the throttle valve 16. The air flowmeter 81 detects an intake air amount GA. The internal combustion engine 10 also includes a fuel injection valve 17, which injects fuel into a section of the intake passage 15 at the downstream side of the throttle valve 16. When an intake valve 18 is open, fuel and air are introduced into the cylinder 11 via the intake passage 15. Then, in the cylinder 11, mixture of the air introduced through the intake passage 15 and the fuel injected from the fuel injection valve 17 is burned by spark discharge of an ignition device 19.

The internal combustion engine 10 includes a crankcase that accommodates the crankshaft 14. The crankcase is provided with an oil pan 33, which stores engine oil of the internal combustion engine 10. The engine oil is pumped up from the oil pan 33 and supplied to each part of the internal combustion engine 10. Also, the internal combustion engine 10 is equipped with a blow-by gas treating device 30 that introduces blow-by gas into the intake passage 15. The blow-by gas treating device 30 includes a blow-by gas passage 31, which connects the crankcase to a section of the intake passage 15 at the downstream side of the throttle valve 16. A PCV valve 32 is provided in the blow-by gas passage 31.

The internal combustion engine 10 is also provided with a crank angle sensor 82, which measures the rotational angle of the crankshaft 14. The internal combustion engine 10 is provided with a coolant temperature sensor 83, which detects the temperature of coolant circulating in the water jacket of the internal combustion engine 10.

Exhaust gas generated by burning the air-fuel mixture in the cylinder 11 is discharged to an exhaust passage 21 when an exhaust valve 20 is opened. The exhaust passage 21 is provided with a three-way catalyst 22 and a particulate filter 23, which is arranged at the downstream side of the three-way catalyst 22. The particulate filter 23 has a function of collecting particulate matter (PM) contained in the exhaust gas flowing through the exhaust passage 21.

An air-fuel ratio sensor 84 is arranged at the upstream side of the three-way catalyst 22 in the exhaust passage 21 to detect the oxygen concentration of the gas flowing through the exhaust passage 21, that is, the air-fuel ratio of the air-fuel mixture. Further, an exhaust temperature sensor 85 for detecting the temperature of the gas flowing through the exhaust passage 21 is arranged between the three-way catalyst 22 and the particulate filter 23 in the exhaust passage 21.

In the internal combustion engine 10, combustion of air-fuel mixture in the cylinder 11 may be stopped while the vehicle is traveling and the crankshaft 14 is rotating. The period during which the combustion of air-fuel mixture in the cylinder 11 is stopped while the crankshaft 14 is rotating will be referred to as a combustion stop period CSP. In the combustion stop period CSP, the piston 12 reciprocates in synchronization with rotation of the crankshaft 14. Thus, the air introduced into the cylinder 11 via the intake passage 15 flows out to the exhaust passage 21 without being used in combustion.

In the combustion stop period CSP, either a fuel cutoff process or a fuel introduction process is selected and executed. The fuel cutoff process stops fuel injection of the fuel injection valve 17. The fuel introduction process causes the fuel injection valve 17 to inject fuel and causes the fuel to flow out unburned from inside the cylinder 11 to the exhaust passage 21. When the fuel introduction process is executed, the fuel injected from the fuel injection valve 17 flows through the exhaust passage 21 together with air. The fuel is introduced into the three-way catalyst 22. At this time, if the temperature of the three-way catalyst 22 is higher than or equal to the activation temperature, and a sufficient amount of oxygen is present in the three-way catalyst 22 to burn the fuel, the fuel is burned in the three-way catalyst 22. This increases the temperature of the three-way catalyst 22. Then, high temperature gas flows into the particulate filter 23, increasing the temperature of the particulate filter 23. When oxygen is introduced into the particulate filter 23 under a situation in which the temperature of the particulate filter 23 has been increased to a certain extent, the particulate matter (PM) trapped by the particulate filter 23 is burned.

Next, the control configuration of the hybrid vehicle will be described with reference to FIGS. 1 and 2.

As shown in FIG. 1, the vehicle controller 100 of the hybrid vehicle calculates a required torque TQR, which is the torque to be output to the ring gear shaft 45, based on an accelerator operation amount ACC and a vehicle speed VS. The accelerator operation amount ACC is the operation amount of an accelerator pedal AP by the driver of the vehicle and is a value detected by an accelerator operation amount sensor 86. The vehicle speed VS is a value corresponding to the traveling speed of the vehicle and is detected by a vehicle speed sensor 87. The vehicle controller 100 controls the internal combustion engine 10 and the motor generators 71 and 72 based on the calculated required torque TQR.

The vehicle controller 100 includes an engine controlling unit 110, which controls the internal combustion engine 10, and a motor controlling unit 120, which controls the motor generators 71 and 72. The engine controlling unit 110 corresponds to one example of a controller for an internal combustion engine in the present embodiment. When the fuel introduction process is executed during the combustion stop period CSP, the motor controlling unit 120 controls operation of the first motor generator 71 to perform the motoring. That is, the rotation speed of the crankshaft 14 in the combustion stop period CSP can controlled through the performance of the motoring.

FIG. 2 shows the functional configuration of the engine controlling unit 110. The engine controlling unit 110 includes, as functional components, an ignition controlling section 111, which controls the ignition device 19, an injection valve controlling section 112, which controls the fuel injection valve 17, and a dilution learning section 113.

The engine controlling unit 110 receives detection signals from various types of sensors. For example, the engine controlling unit 110 calculates the engine rotation speed NE of the internal combustion engine 10 based on a detection signal from the crank angle sensor 82. The engine controlling unit 110 calculates the intake air amount GA based on a detection signal from the air flowmeter 81. The engine controlling unit 110 also calculates a coolant temperature THW based on a detection signal from the coolant temperature sensor 83. Further, the engine controlling unit 110 estimates an oil temperature THO, which is the temperature of the engine oil, based on the coolant temperature THW.

The dilution learning section 113 estimates the amount of diluting fuel, which is the fuel mixed in the engine oil. The dilution learning section 113 calculates an estimated dilution value DIL as an estimated amount of the diluting fuel. The estimated dilution value DIL is calculated based on, for example, an addition dilution amount and a subtraction dilution amount.

In one example of calculation of the addition dilution amount, the addition dilution amount is calculated by multiplying a basic addition amount by a coolant temperature correction factor. The basic addition amount is calculated based on an accumulated value of the intake air amount GA and the elapsed time since the internal combustion engine 10 is started. The basic addition amount is calculated as a greater value as the accumulated value of the intake air amount GA increases. Also, the basic addition amount is calculated as a smaller value as the elapsed time from starting the internal combustion engine 10 becomes longer. The coolant temperature correction factor is calculated based on the coolant temperature THW. The wall temperature in the cylinder 11 is lowered as the coolant temperature THW is lowered, so that the fuel collecting on the wall becomes less likely to volatilize. Therefore, the amount of fuel mixed into the engine oil increases as the coolant temperature THW is lowered. That is, the coolant temperature correction factor is calculated as a value with which the addition dilution amount is calculated to be a greater value as the coolant temperature THW is lowered.

Further, the dilution learning section 113 increases the addition dilution amount if there is a history of execution of the fuel introduction process. The reason for the execution of this process is that, when the fuel introduction process is performed, the amount of fuel mixed in the engine oil is greater than that in a case in which air-fuel mixture is burned in the cylinder 11.

Figure 3:
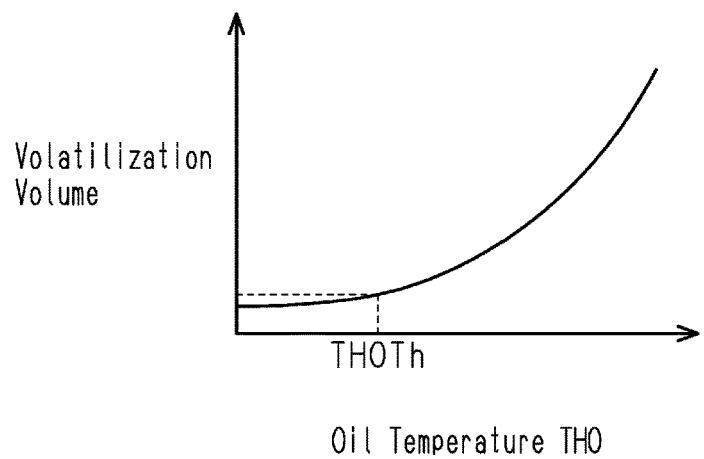
FIG. 3 is a diagram showing the relationship between the oil temperature and the volatilization volume of fuel.

In one example of calculation of the subtraction dilution amount, the subtraction dilution amount is calculated by multiplying a basic subtraction amount by an oil temperature correction factor. The basic subtraction amount is calculated as a greater value as the amount of the diluting fuel increases. Specifically, the basic subtraction amount is calculated to be a greater value as the sum of the previous value of the estimated dilution value DIL and the addition dilution amount increases. The oil temperature correction factor is calculated based on the oil temperature THO. The amount of fuel volatilizing from the engine oil increases as the oil temperature THO increases. FIG. 3 shows the relationship between the oil temperature THO and the volatilization volume, which is the amount of diluting fuel that volatilizes from the engine oil. In the region where the oil temperature THO is lower than a temperature determination value THOTh, the volatilization volume is small. In the region where the oil temperature THO is higher than or equal to the temperature determination value THOTh, the volatilization volume increases as the oil temperature THO increases. Thus, the diluting fuel is reduced as the oil temperature THO increases. That is, as the oil temperature THO increases, the oil temperature correction factor is calculated as a value with which the subtraction dilution amount is calculated to be a greater value.

In the process of calculating the estimated dilution value DIL based on the above-described addition dilution amount and subtraction dilution amount, the dilution learning section 113 calculates the estimated dilution value DIL by subtracting the subtraction dilution amount from the sum of the previous value of the estimated dilution value DIL and the addition dilution amount.

The dilution learning section 113 learns the fuel concentration of the blow-by gas as a dilution learned value LDIL.

When combustion in the cylinder 11 is being performed, exhaust air-fuel ratio F/B is performed, in which the internal combustion engine 10 is controlled such that the deviation between an air-fuel ratio detection value AF detected by the air-fuel ratio sensor 84 and an air-fuel ratio target value AFt is reduced. When combustion in the cylinder 11 is being performed, the dilution learning section 113 estimates the fuel concentration of the blow-by gas by using a correction value AFFB for reducing the deviation between the air-fuel ratio detection value AF and the air-fuel ratio target value AFt, thereby updating the dilution learned value LDIL.

In contrast, when combustion in the cylinder 11 is stopped, the learned value immediately before the combustion is stopped is read as the dilution learned value LDIL. When the fuel introduction process is executed during the combustion stop period CSP, the dilution learning section 113 updates the dilution learned value LDIL such that the dilution learned value LDIL increases based on the accumulated injection amount in the fuel introduction process.

The procedure for driving the fuel injection valve 17 through control by the injection valve controlling section 112 will be described with reference to FIG. 4.

Figure 4:
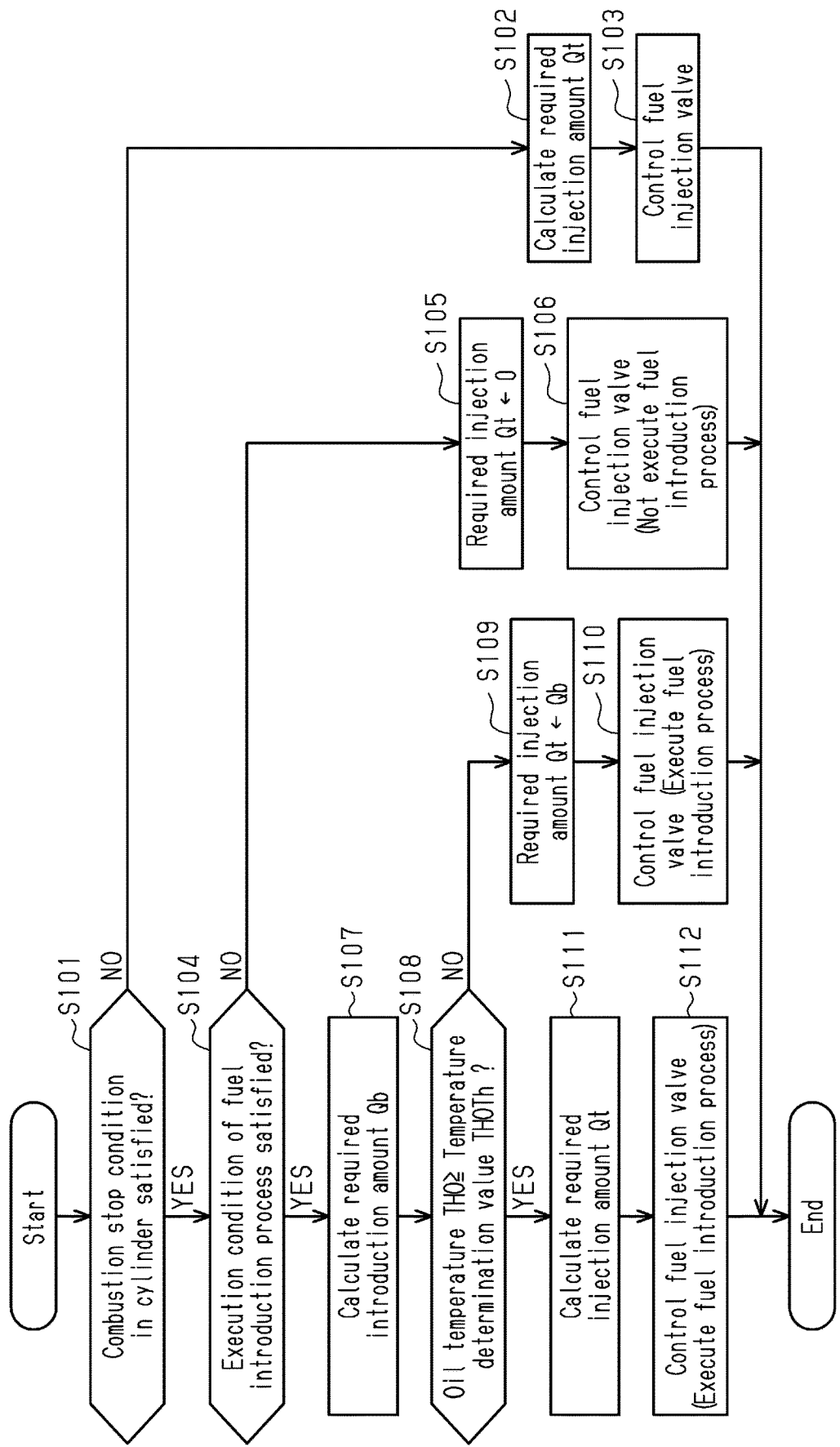
FIG. 4 is a flowchart showing the procedure for controlling the fuel injection valve in the internal combustion engine of FIG. 1.

In the series of processes shown in FIG. 4, the first step S101 determines whether a combustion stop condition of air-fuel mixture in the cylinder 11 is satisfied. Whether the combustion stop condition of air-fuel mixture in the cylinder 11 is satisfied is determined, for example, by the engine controlling unit 110 in the following manner. When the required value of the output torque of the internal combustion engine 10 is less than or equal to 0, it is determined that the combustion stop condition of the air-fuel mixture in the cylinder 11 is satisfied. When the required value of the output torque of the internal combustion engine 10 is greater than 0, it is determined that the combustion stop condition of the air-fuel mixture in the cylinder 11 is not satisfied, that is, it is determined that the stop condition is not satisfied. When the state in which the combustion stop condition is not satisfied is shifted to the state in which the combustion stop condition is satisfied, stop of combustion of air-fuel mixture in the cylinder 11 is requested. When the state in which the combustion stop condition of air-fuel mixture in the cylinder 11 is satisfied is shifted to the state in which the combustion stop condition is not satisfied, restart of combustion of air-fuel mixture in the cylinder 11 is requested.

If it is determined in step S101 that the above-described combustion stop condition of air-fuel mixture in the cylinder 11 is not satisfied (S101: NO), the process proceeds to the subsequent step S102. In step S102, a required injection amount Qt is calculated as the required value of the fuel injection amount from the fuel injection valve 17. In this process, the required injection amount Qt is calculated based on, for example, the correction value AFFB. The correction value AFFB is an air-fuel ratio correction value for reducing the deviation between the air-fuel ratio detection value AF detected by the air-fuel ratio sensor 84 and the air-fuel ratio target value AFt in the exhaust air-fuel ratio F/B. Since the required injection amount Qt in the case of burning air-fuel mixture in the cylinder 11 is calculated, the air-fuel ratio target value AFt is set to the stoichiometric air-fuel ratio or a value close to the stoichiometric air-fuel ratio, for example. When the required injection amount Qt is calculated, the process proceeds to the subsequent step S103. In step S103, the operation of the fuel injection valve 17 is controlled based on the required injection amount Qt calculated in step S102. The series of processes is then temporarily ended.

In contrast, if it is determined in step S101 that the above-described combustion stop condition of air-fuel mixture in the cylinder 11 is satisfied (S101: YES), the process proceeds to the subsequent step S104. In step S104, it is determined whether the execution condition of the fuel introduction process is satisfied. As described above, one of the fuel cutoff process and the fuel introduction process is selected and executed during the combustion stop period CSP. Specifically, after the combustion stop period CSP starts, the fuel cutoff process is executed if at least one of the following conditions 1 to 3 is not satisfied. In contrast, when all of the following conditions 1 to 3 are satisfied during the combustion stop period CSP, it is determined that the condition for executing the fuel introduction process is satisfied.

Condition 1: It can be determined that the temperature of the three-way catalyst 22 is higher than or equal to a specified temperature.

Condition 2: The estimated value of the amount of trapped particulate matter in the particulate filter 23 is greater than or equal to a determination trapped amount.

Condition 3: The estimated dilution value DIL is less than a threshold DILTh

Regarding the condition 1, when unburned fuel is introduced into the three-way catalyst 22, the unburned fuel may not be burned if the temperature of the three-way catalyst 22 is low. Therefore, the specified temperature is set in advance as a criterion for determining whether the unburned fuel introduced into the three-way catalyst 22 can be burned. That is, the specified temperature is set to the activation temperature of the three-way catalyst 22 or a temperature slightly higher than the activation temperature.

Regarding the condition 2, as the amount of particulate matter trapped by the filter 23 increases, the clogging of the filter 23 progresses. Therefore, the determination trapped amount is set in advance as a criterion for determining whether the clogging has progressed to such an extent that the filter 23 needs to be regenerated. When the trapped amount increases, the pressure difference between the section in the exhaust passage 21 between the three-way catalyst 22 and the particulate filter 23 and the section in the exhaust passage 21 that is at the downstream side of the particulate filter 23 is likely to increase. Therefore, the pressure difference can be used to calculate the estimated value of the trapped amount.

Regarding the condition 3, as the estimated dilution value DIL increases, a greater amount of diluting fuel is contained in the engine oil, and the engine oil may have been saturated. That is, the volatilization volume becomes more likely to increase as the estimated dilution value DIL increases. If the fuel introduction process is executed in a situation where the volatilization volume is great, excessive fuel may be introduced into the three-way catalyst 22. Therefore, the threshold DILTh is set as a criterion for determining whether there the estimated dilution value DIL is great.

That is, in step S104, if at least one of the conditions 1 to 3 is not satisfied, it is determined that the condition for executing the fuel introduction process is not satisfied. The fuel cutoff process is executed in the subsequent processes. In contrast, when all of the conditions 1 to 3 are satisfied, it is determined that the condition for executing the fuel introduction process is satisfied. The fuel introduction process is executed in the subsequent processes.

If it is determined in step S104 that the condition for executing the fuel introduction process is not satisfied (S104: NO), the process proceeds to step S105. In step S105, the required injection amount Qt is set to 0, and the subsequent process proceeds to step S106. In step S106, the operation of the fuel injection valve 17 is controlled based on the required injection amount Qt. Since the fuel cutoff process is executed, no fuel is injected. The series of processes is then temporarily ended.

If it is determined in step S104 that the condition for executing the fuel introduction process is satisfied (S104: YES), the process proceeds to step S107. In step S107, a required introduction amount Qb is calculated. The required introduction amount Qb is calculated as a required value of fuel to be introduced into the three-way catalyst 22 in the fuel introduction process. The required introduction amount Qb is calculated based on the target air-fuel ratio of the air-fuel mixture flowing out from the cylinder 11 to the exhaust passage 21 in the fuel introduction process. The air-fuel ratio goal of the air-fuel mixture in the fuel introduction process is set as a value for increasing the temperature of the three-way catalyst 22 to a specified target temperature. The required value of fuel in the fuel introduction process is less than the required injection amount Qt when burning air-fuel mixture in the cylinder 11. Thus, the target air-fuel ratio of the air-fuel mixture that flows out to the exhaust passage 21 during the execution of the fuel introduction process is leaner than the air-fuel ratio when burning the air-fuel mixture in cylinder 11 (that is, the stoichiometric air-fuel ratio). When the required introduction amount Qb is calculated, the process proceeds to step S108.

In step S108, it is determined whether the oil temperature THO is higher than or equal to the temperature determination value THOTh. If the oil temperature THO is lower than the temperature determination value THOTh (S108: NO), the process proceeds to step S109. In step S109, a required injection amount Qb is set. In the present embodiment, the required injection amount Qt is set to the value of the required introduction amount Qb calculated in step S107. Thereafter, the process proceeds to step S110. In step S110, the operation of the fuel injection valve 17 is controlled based on the required injection amount Qt, which has been set in step S109. That is, the fuel introduction process is executed. The series of processes is then temporarily ended.

If the oil temperature THO is higher than or equal to the temperature determination value THOTh (S108: YES), the process proceeds to step S111. In step S111, the required injection amount Qb is calculated. When the oil temperature THO is higher than or equal to the temperature determination value THOTh, the volatilization volume increases as the oil temperature THO increases. The volatilization volume is taken into consideration in calculating the required injection amount Qt. Specifically, the required injection amount Qt is calculated in the following manner.

Figure 5:
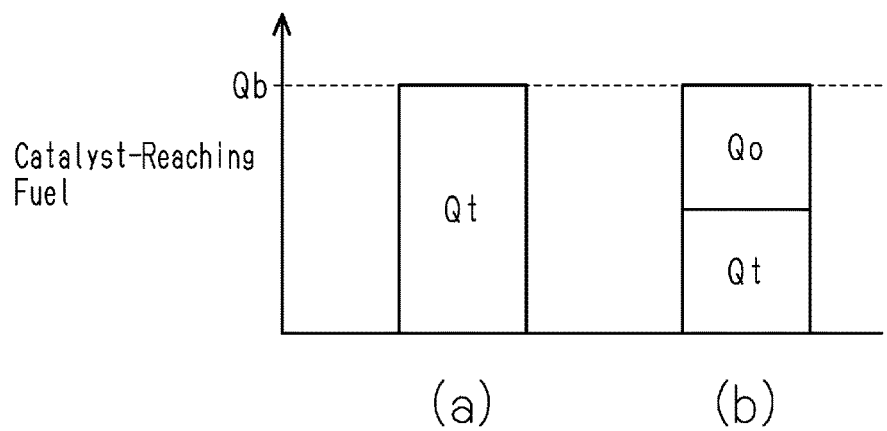
FIG. 5 is a diagram schematically showing the amount of fuel reaching the catalyst through a fuel introduction process in the internal combustion engine of FIG. 1.

FIG. 5 shows catalyst-reaching fuel that is estimated to reach the three-way catalyst 22 during the execution of the fuel introduction process.

When the oil temperature THO is lower than the temperature determination value THOTh, the volatilization volume from the engine oil is small. The catalyst-reaching fuel is thus estimated to be close to the amount of the fuel injected from the fuel injection valve 17. The section (a) of FIG. 5 shows an example in which the oil temperature THO is lower than the temperature determination value THOTh. In such a case, setting the required injection amount Qt to the value of required introduction amount Qb allows the required introduction amount Qb of fuel to reach the catalyst.

In contrast, when the oil temperature THO is higher than or equal to the temperature determination value THOTh, blow-by gas containing volatilized fuel is introduced into the intake passage 15 via the blow-by gas passage 31. It is thus estimated that volatilized fuel is introduced into the three-way catalyst 22 in addition to the fuel injected from the fuel injection valve 17. The section (b) of FIG. 5 shows, as a non-injected introduction amount Qo, the amount of fuel that is introduced into the intake passage 15 through the blow-by gas passage 31 and reaches the three-way catalyst 22. The non-injected introduction amount Qo increases as the dilution learned value LDIL, which is calculated by the dilution learning section 113, increases. At this time, if the required injection amount Qt is set to the value of the required introduction amount Qb as in the case of the section (a) of FIG. 5, the amount of the catalyst-reaching fuel will be greater than the required introduction amount Qb, so that excessive fuel will be introduced into the three-way catalyst 22. Thus, the section (b) of FIG. 5 shows an example in which the required injection amount Qt is calculated by taking into consideration the non-injected introduction amount Qo. Specifically, the required injection amount Qt is calculated such that the sum of the non-injected introduction amount Qo and the required injection amount Qt is the required introduction amount Qb. This allows the required introduction amount Qb of fuel to reach the catalyst. That is, in the process of step S111 in FIG. 4, the required injection amount Qt is calculated as a smaller value as the dilution learned value LDIL increases.

When the required injection amount Qt is calculated in step S111, the process proceeds to step S112. In step S112, the operation of the fuel injection valve 17 is controlled based on the required injection amount Qt, which has been set in step S111. That is, the fuel introduction process is executed. The series of processes is then temporarily ended.

The minimum value of the required injection amount Qt calculated in step S111 may be a value greater than 0 or may be 0. If the calculated required injection amount Qt is 0, the fuel introduction process will not be executed in step S112.

The operation and advantages of the present embodiment will now be described.

Figure 6:
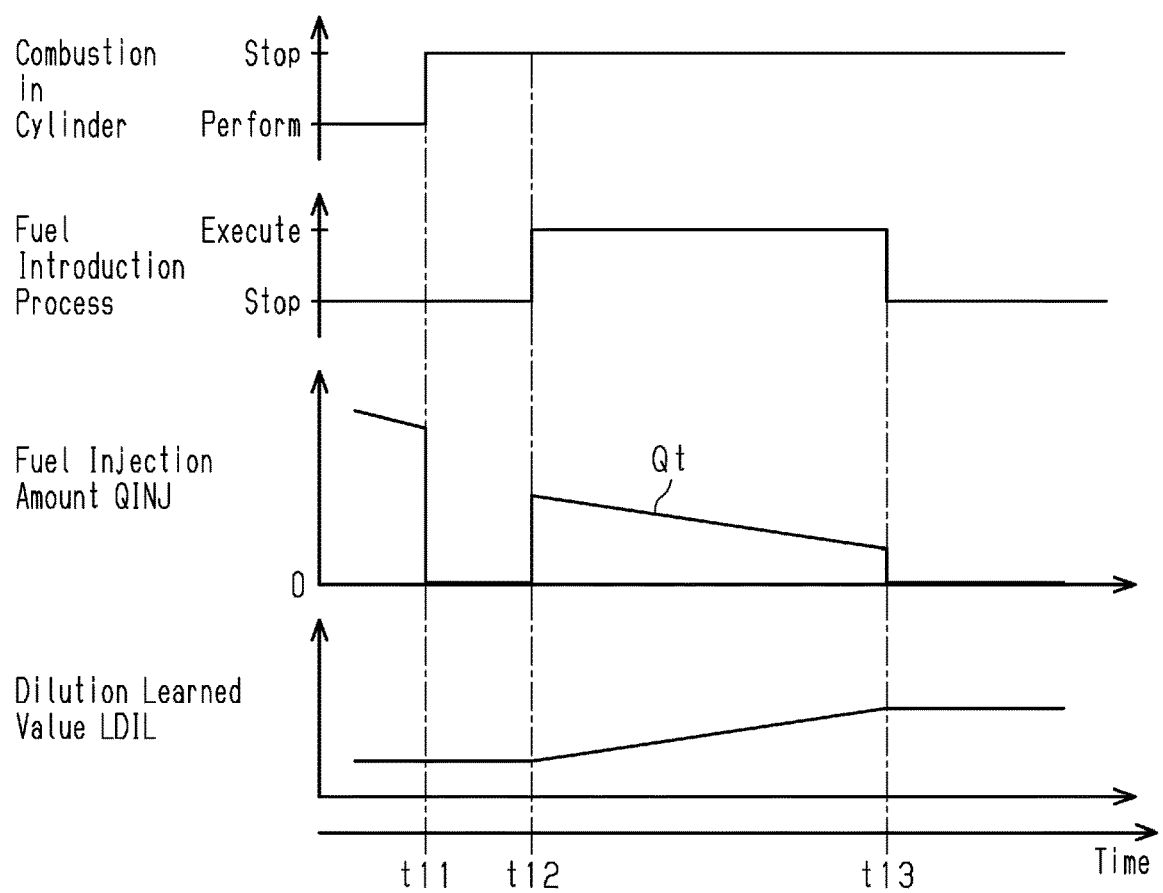
FIG. 6 is a timing diagram showing a case in which the fuel introduction process is executed in the internal combustion engine of FIG. 1.

Referring to FIG. 6, a fuel injection amount QINJ injected from the fuel injection valve 17 through the fuel introduction process during the combustion stop period CSP will be described. In FIG. 6, it is determined at a point in time t11 that the combustion stop condition is satisfied. Further, at a point in time t12, it is determined that the execution condition of the fuel introduction process is satisfied. Then, at a point in time t13, it is determined that the execution condition of the fuel introduction process is not satisfied. In this example, the oil temperature THO is higher than or equal to the temperature determination value THOTh.

Before the point in time t11, combustion in the cylinder 11 is performed. That is, the required injection amount Qt is calculated by the process of step S102 in FIG. 4, and the operation of the fuel injection valve 17 is controlled based on the required injection amount Qt.

As shown in FIG. 6, combustion in the cylinder 11 is stopped from the point in time t11. In the period from the point in time t11 to the point in time t12, the execution condition of the fuel introduction process is not satisfied, so that the required injection amount Qt is set to 0 by the process of step S105 in FIG. 4. That is, the fuel cutoff process is being executed, and the fuel injection amount QINJ is 0.

The execution of the fuel introduction process is started from the point in time t12. The fuel introduction process is executed during the period from the point in time t12 to the point in time t13. In the example shown in FIG. 6, it is assumed that the required introduction amount Qb calculated in the process of step S107 in FIG. 4 has a constant value during the period from the point in time t12 to the point in time t13. At the point in time t12, the required injection amount Qt is calculated by the injection valve controlling section 112, and the operation of the fuel injection valve 17 is controlled based on the required injection amount Qt. Since the execution of the fuel introduction process continues until the point in time t13, the dilution learned value LDIL is updated by the dilution learning section 113 so as to gradually increase. Since the dilution learned value LDIL increases, the required injection amount Qt is gradually reduced in the process of step S111 in FIG. 4. As a result, the fuel injection amount QINJ gradually decreases during the period from the point in time t12 to the point in time t13.

After the point in time t13, the execution of the fuel introduction process is ended and the fuel cutoff process is performed.

The engine controlling unit 110 of the present embodiment calculates the required injection amount Qt in the fuel introduction process to be a smaller value as the dilution learned value LDIL increases. That is, since the required injection amount Qt is corrected by reflecting the dilution learned value LDIL, which is correlated to the fuel concentration of the blow-by gas, excessive fuel is prevented from being introduced into the three-way catalyst 22. It is thus possible to introduce a great amount of fuel into the three-way catalyst 22 within the range in which excessive heating of the three-way catalyst 22 can be prevented, while preventing excessive heating of the three-way catalyst 22.

Also, in the present embodiment, as described above, the required injection amount Qt is reduced as the dilution learned value LDIL increases. Since the volatilization volume increases as the oil temperature THO increases, the dilution learned value LDIL, which is an estimated value of the fuel concentration of the blow-by gas, is likely to increase. Thus, the required injection amount Qt is calculated to be a smaller value as the oil temperature THO increases. That is, in the present embodiment, the amount of fuel injected from the fuel injection valve 17 during the combustion stop period CSP is reduced as the oil temperature THO increases. Also, in the present embodiment, the process of reducing the amount of fuel injected from the fuel injection valve 17 during the combustion stop period CSP is executed when the oil temperature THO is higher than or equal to the temperature determination value THOTh and is not executed when the oil temperature THO is lower than the temperature determination value THOTh. As shown in FIG. 3, the temperature determination value THOTh is set such that the volatilization volume is small in the range where the oil temperature THO is lower than the temperature determination value THOTh. The process of reducing the amount of fuel injected from the fuel injection valve 17 during the combustion stop period CSP is executed when the volatilization volume tends to increase as the oil temperature THO increases. Accordingly, the amount diluting fuel that volatilizes and reaches the three-way catalyst 22 is taken into consideration to prevent excessive fuel from being introduced into the three-way catalyst 22.

Further, in the present embodiment, one of the conditions for execution of the fuel introduction process is that the estimated dilution value DIL is less than the threshold DILTh (see the condition 3). When the estimated dilution value DIL is greater than or equal to the threshold DILTh, it is determined that the above execution condition of the fuel introduction process is not satisfied, so that the fuel introduction process is not executed. In other words, when the estimated dilution value DIL is greater than or equal to the threshold DILTh, fuel is not injected from the fuel injection valve 17 during the combustion stop period CSP. Accordingly the fuel introduction process is not executed when the amount of fuel volatilizing from the engine oil is great due to a great amount of diluting fuel, so that the fuel concentration of the blow-by gas tends to increase. That is, excessive fuel is prevented from being introduced into the three-way catalyst 22.

The above-described embodiment may be modified as follows. The above-described embodiments and the following modifications can be combined as long as the combined modifications remain technically consistent with each other.

In the above-described embodiment, the required injection amount Qt is calculated to be smaller as the dilution learned value LDIL increases. The value to be referred to when calculating the required injection amount Qt in the fuel introduction process is not limited to the dilution learned value LDIL. For example, the required injection amount Qt may be calculated to be smaller as the correction value AFFB used in the exhaust air-fuel ratio F/B increases. In a configuration that performs the exhaust air-fuel ratio F/B, the fuel concentration of blow-by gas can be estimated to be high when the correction value AFFB for reducing the deviation between the air-fuel ratio detection value AF and the air-fuel ratio target value AFt is great. That is, reducing the required injection amount Qt as the correction value AFFB increases prevents excessive fuel from being introduced into the three-way catalyst 22, so that the three-way catalyst 22 will not be excessively heated.

The execution condition of the fuel introduction process may include a condition that the correction value AFFB is less than an allowable value FBA (Condition 4). The allowable value FBA is set such that the deviation between the air-fuel ratio detection value AF and the air-fuel ratio target value AFt is small if the correction value AFFB is less than the allowable value FBA. In this configuration, when the correction value AFFB immediately before the execution of the fuel introduction process is greater than or equal to the allowable value FBA, it is determined that the execution condition of the fuel introduction process is not satisfied, so that the fuel introduction process is not executed. That is, if the correction value AFFB used in the exhaust air-fuel ratio F/B is great and the fuel concentration of the blow-by gas is estimated to be high, the fuel introduction process is not executed. This prevents excessive fuel from being introduced into the three-way catalyst 22, so that the three-way catalyst 22 will not be excessively heated.

In the above-described embodiment, the required injection amount Qt is calculated based on the dilution learned value LDIL when the oil temperature THO is greater than the temperature determination value THOTh. The present disclosure is not limited to this, and the required injection amount Qt may be calculated even in a range where the oil temperature THO is lower than the temperature determination value THOTh.

In the above-described embodiment, the ignition device 19 does not perform spark discharge during the execution of the fuel introduction process. However, during the execution of the fuel introduction process, spark discharge of the ignition device 19 may be performed in a period in which the air-fuel mixture is not burned in the cylinder 11. For example, if spark discharge is performed when the piston 12 is located near the bottom dead center, the air-fuel mixture is not burned in the cylinder 11 in which spark discharge has been performed. Therefore, even if spark discharge is performed during the execution of the fuel introduction process, the fuel injected from the fuel injection valve 17 can flow out unburned to the exhaust passage 21 from inside the cylinders 11.

The internal combustion engine for which the controller is employed may be an engine that includes a direction injection valve, which injects fuel directly into the cylinder 11. In this case, during the execution of the fuel introduction process, fuel may be injected from the direct injection valve into cylinder 11 and flow out unburned to the exhaust passage 21. Unburned fuel is thus introduced into the three-way catalyst 22.

The system of the hybrid vehicle may be a system different from the system shown in FIG. 1 as long as the rotation speed of the crankshaft 14 is controlled through operation of a motor.

The controller for an internal combustion engine may be used for an internal combustion engine mounted on a vehicle that does not have a power source other than the internal combustion engine. Even in the internal combustion engine installed in such a vehicle, the three-way catalyst 22 can be prevented from being excessively heated by calculating the required injection amount Qt in the fuel introduction process in the same manner as in the above-described embodiment.

The controller (engine controlling unit) can be constructed by a device that includes a CPU and a ROM and executes software processing, but is not limited to this configuration. For example, at least part of the processes executed by the software in the above-illustrated embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine comprising a blow-by gas treating device that discharges blow-by gas into intake air and being configured to burn, in a cylinder, air-fuel mixture containing fuel injected from a fuel injection valve by spark discharge of an ignition device, wherein
    the controller is configured to select and execute one of a fuel cutoff process and a fuel introduction process when stopping combustion in the cylinder under a situation in which a crankshaft of the internal combustion engine is rotating,
    the fuel cutoff process stops fuel injection of the fuel injection valve,
    the fuel introduction process causes the fuel injection valve to inject fuel, thereby allowing the fuel to flow out unburned from the cylinder to an exhaust passage,
    the controller further comprises an injection valve controlling section,
    the injection valve controlling section is configured to control the fuel injection valve to regulate a fuel injection amount in a period in which the combustion in the cylinder is stopped under the situation in which the crankshaft is rotating, and
    the injection valve controlling section is further configured to decrease the fuel injection amount from the fuel injection valve as an oil temperature that is the temperature of engine oil increases.

2. The controller for an internal combustion engine according to claim 1, wherein the injection valve controlling section is configured to decrease the fuel injection amount from the fuel injection valve as the oil temperature increases when the oil temperature is higher than or equal to a temperature determination value.

3. The controller for an internal combustion engine according to claim 1, wherein
    the controller further comprises a dilution learning section that is configured to learn a concentration of fuel contained in the blow-by gas as a dilution learned value,
    the injection valve controlling section is configured to calculate a required injection amount as a target value of the fuel injection amount from the fuel injection valve and control the fuel injection valve based on the required injection amount, and
    the injection valve controlling section is further configured to decrease the required injection amount as the dilution learned value increases.

4. The controller for an internal combustion engine according to claim 1, wherein
    the controller is further configured to set, when the combustion in the cylinder is performed, the fuel injection amount from the fuel injection valve by using an air-fuel ratio correction value for reducing a deviation between an exhaust air-fuel ratio and a target exhaust air-fuel ratio,
    the injection valve controlling section is configured to calculate a required injection amount as a target value of the fuel injection amount from the fuel injection valve and control the fuel injection valve based on the required injection amount, and the injection valve controlling section is further configured to decrease the required injection amount as the air-fuel ratio correction value before execution of the fuel introduction process increases.

5. The controller for an internal combustion engine according to claim 1, wherein
the controller is further configured to set, when the combustion in the cylinder is performed, the fuel injection amount from the fuel injection valve by using an air-fuel ratio correction value for reducing a deviation between an exhaust air-fuel ratio and a target exhaust air-fuel ratio, and
the injection valve controlling section is configured not to execute the fuel introduction process when the air-fuel ratio correction value before execution of the fuel introduction process is greater than or equal to an allowable value.

6. The controller for an internal combustion engine according to claim 1, wherein
the controller further comprises a dilution learning section that calculates an amount of fuel contained in the engine oil as an estimated dilution value, and
the injection valve controlling section is configured not to execute the fuel introduction process when the estimated dilution value is greater than or equal to a threshold.

7. A control method for an internal combustion engine, the internal combustion engine comprising a blow-by gas treating device that discharges blow-by gas into intake air and being configured to burn, in a cylinder, air-fuel mixture containing fuel injected from a fuel injection valve by spark discharge of an ignition device, the method comprising:
selecting and executing one of a fuel cutoff process and a fuel introduction process when stopping combustion in the cylinder under a situation in which a crankshaft of the internal combustion engine is rotating, wherein the fuel cutoff process stops fuel injection of the fuel injection valve, and the fuel introduction process causes the fuel injection valve to inject fuel, thereby allowing the fuel to flow out unburned from the cylinder to an exhaust passage;
adjusting of controlling the fuel injection valve to regulate a fuel injection amount in a period in which the combustion in the cylinder is stopped under the situation in which the crankshaft is rotating; and
decreasing the fuel injection amount from the fuel injection valve as an oil temperature that is the temperature of engine oil increases.

8. A non-transitory computer readable memory medium storing a program that causes a processor to perform a controlling process of an internal combustion engine, the internal combustion engine comprising a blow-by gas treating device that discharges blow-by gas into intake air and being configured to burn, in a cylinder, air-fuel mixture containing fuel injected from a fuel injection valve by spark discharge of an ignition device, the controlling process comprises:
selecting and executing one of a fuel cutoff process and a fuel introduction process when stopping combustion in the cylinder under a situation in which a crankshaft of the internal combustion engine is rotating, wherein the fuel cutoff process stops fuel injection of the fuel injection valve, and the fuel introduction process causes the fuel injection valve to inject fuel, thereby allowing the fuel to flow out unburned from the cylinder to an exhaust passage;
adjusting of controlling the fuel injection valve to regulate a fuel injection amount in a period in which the combustion in the cylinder is stopped under the situation in which the crankshaft is rotating; and
decreasing the fuel injection amount from the fuel injection valve as an oil temperature that is the temperature of engine oil increases.

* * * * *